United States Patent [19]

Bocoviz et al.

[11] Patent Number: 5,605,440
[45] Date of Patent: Feb. 25, 1997

[54] FLOW-STRAIGHTENER VANE MADE OF COMPOSITE, FLOW-STRAIGHTENER INCLUDING IT, FOR A COUNTER-TORQUE DEVICE WITH DUCTED ROTOR AND DUCTED FLOW-STRAIGHTENING STATOR, AND METHOD FOR MANUFACTURING THEM

[75] Inventors: Claude D. Bocoviz, Marseille; André Gautier, Rognes; Henri F. Barquet, Chateauneuf les Martigues, all of France

[73] Assignee: Eurocopter France, Marignane Cedex, France

[21] Appl. No.: 466,296

[22] Filed: Jun. 6, 1995

[30] Foreign Application Priority Data

Jun. 10, 1994 [FR] France .................................. 94 07141

[51] Int. Cl.⁶ .............................. B64C 27/20; F01D 9/00
[52] U.S. Cl. ................... 415/200; 415/209.4; 415/211.2; 244/17.19
[58] Field of Search ................................. 415/200, 209.4, 415/210.1, 211.2, 220; 244/17.19

[56] References Cited

U.S. PATENT DOCUMENTS 3,594,097  7/1969  Mouille et al. .
4,585,391  4/1986  Vuillet et al. .
4,594,761  6/1986  Murphy et al. .
4,626,173 12/1986  Mouille et al. .
5,131,604  7/1992  Yoerkie, Jr. et al. ................... 416/238
5,272,869 12/1993  Dawson et al. .
5,454,691 10/1995  Henri et al. .......................... 415/211.2
5,498,129  3/1996  Dequin et al. ........................ 244/17.19

FOREIGN PATENT DOCUMENTS

1531536  7/1968  France .

*Primary Examiner*—Edward K. Look
*Assistant Examiner*—Mark Sgantzos
*Attorney, Agent, or Firm*—Larson and Taylor

[57] ABSTRACT

The composite vane is moulded by injecting resin into a preform of layers of reinforcing fibres according to the RTM method. The skins of its main vane section as well as of its root and tip via which it is connected to the flow-straightener central body and to part of the duct are laminated with a pile of at least three layers of reinforcing fibres, and complementary piles at the root and tip exhibit at least one fastening tab. The central body is made of metal or composite and the composite vanes are interchangeable, or the vanes and the central body are injection-moulded as a single piece using the RTM method.

24 Claims, 6 Drawing Sheets

FLOW-STRAIGHTENER VANE MADE OF COMPOSITE, FLOW-STRAIGHTENER INCLUDING IT, FOR A COUNTER-TORQUE DEVICE WITH DUCTED ROTOR AND DUCTED FLOW-STRAIGHTENING STATOR, AND METHOD FOR MANUFACTURING THEM

FIELD OF THE INVENTION

The invention relates to the counter-torque devices of the type having a variable-pitch multi-blade rotor and a flow-straightening stator with profiled vanes fastened downstream of the rotor and which are ducted in the rear parts of helicopters having a single main rotor, as described in U.S. Pat. No. 4,585,391, and the invention relates more precisely to a flow-straightener vane made of composite, to a flow-straightener equipped with such vanes, and to a method of manufacturing such a vane as well as such a flow-straightener.

BACKGROUND OF THE INVENTION

U.S. Pat. No. 4,585,391 makes known a counter-torque device with ducted tail rotor and ducted flow-straightening stator for a helicopter, including a duct of axis substantially transverse to the helicopter, and in which are located, on the one hand, the rotor, substantially coaxial with said duct and generating a transverse flow of air and, on the other hand, the flow-straightening stator, including a plurality of profiled vanes fastened inside the said duct downstream of the rotor with respect to the flow of air and arranged in substantially radial fashion with respect to the said duct so as to be able to recover rotational energy from the flow of air at the exit from the rotor in the form of a counter-torque axial thrust adding to that produced by the rotation of the rotor within the duct, without increasing the power transmitted to the rotor for this purpose.

U.S. Pat. No. 4,585,391 also proposes for the vanes of the flow-straightener to extend between a stationary central body substantially coaxial in the duct and the annular wall of the fairing duct, and for them to provide alone the mechanical link between this stationary body and said wall, and therefore the fastening of the stationary body and of the rotor, mounted so that it can rotate on this body, within the duct, as replacement for support arms, often numbering three, generally used to provide this mechanical link between the stationary body and the wall of the duct.

It is further proposed in the abovementioned patent for the duct to exhibit, from the upstream end to the downstream end, a convergent inlet with rounded edge, a cylindrical part, in which the blades of the rotor rotate, and a divergent nozzle ending in a divergent outlet, the flow-straightener being located within the divergent nozzle, and it being possible for the vanes which constitute it to be independent of one another and to have a constant aerodynamic profile and zero twist, for example a profile of the NACA 65A10 type.

Such a flow-straightener with profiled stationary vanes simultaneously fulfils several functions and gives significant advantages:

from the aerodynamic and acoustic standpoints, the vanes straighten out the airflow leaving the rotor and thus enable some of the rotational energy of the airflow to be converted into additional counter-torque thrusts, and the replacement of the known support arms [most often cylindrical and of relatively significant diameters, bathed in the flow from the rotor and constituting one of the significant sources of noise of the device due to the noise of interaction between the rotor and support arms] with profiled vanes decreases the drag while reducing the acoustic emissions of the ducted device;

from the standpoints of the transmission of loading and rigidity, the flow-straightener connecting the structure of the helicopter to the mechanical assembly mounted in the duct makes it possible to transmit all the loadings from the hub of the rotor, from the rear transmission box (for the rotational drive of the rotor) and from the collective pitch control of the blades of the rotor to the wall of the duct, these loadings being better distributed by the vanes in the fairing, so that the use of ribs for taking up load in the latter proves pointless, the flow-straightener increasing the rigidity of the assembly owing to the fact that its vanes provide more numerous points for taking up loads on the wall of the duct than a conventional tripod of support arms.

SUMMARY OF THE INVENTION

The problem at the root of the invention is to propose composite vanes giving a saving in mass by comparison with metal vanes whilst offering substantially the same rigidity and strength, and the structure of which is simple and economical despite their composite construction. Another objective is to propose a composite vane which is interchangeable with metal vanes, and therefore suited to easy and independent fastening of each vane, in a way which allows it advantageously to fulfil the aforementioned functions simultaneously, facilitating maintenance of the flow-straightener.

Another object of the invention is to propose a method for economical production of such composite flow-straightener vanes.

Yet another object is to propose a composite flow-straightener made as a single piece and which is interchangeable, making it possible to optimize the savings in mass, and a method for manufacturing it.

To this end, the subject of the invention is a flow-straightener vane for a ducted counter-torque device of a rotary-wing aircraft, such as a helicopter, comprising:

a duct, of axis substantially transverse to the longitudinal axis of the aircraft, and passing through the rear part of the aircraft in which part it is delimited by an annular wall, a rotor mounted substantially coaxial in the duct and driven in rotation by a mechanism fastened substantially coaxially in the duct so that the rotation of the rotor generates an airflow in the duct, and a flow-straightening stator, fastened into the duct downstream of the rotor with respect to the direction of airflow, and including an annular central body surrounding the rotational-drive mechanism, as well as vanes each one exhibiting a main vane section with aerodynamic profile straightening out the airflow down-stream of the rotor towards the axis of the duct, and extending between a vane root and a vane tip at its ends, and via which the vane is fastened respectively to the central body and to the annular duct wall, so as to support the rotational-drive mechanism and the rotor in the duct, and the vane is characterized in that it is composite and its main vane section exhibits laminated suction face and pressure face parts each comprising a pile of at least three layers of reinforcing fibres, essentially made of carbon, made rigid by a thermosetting synthetic agglomerating resin, at least one of the layers, either the internal one or the external one, of the pile comprising two sets of essentially unidirectional fibres orientated from approximately 30° to approximately 70° with respect to each other and substantially symmetrically with respect to the longitudinal axis of the vane along its span, and the intermediate layer comprises a set of essentially unidirectional fibres orientated substantially along the said longitudinal axis of the vane, at least one from among the vane root and vane tip exhibiting at least one laminated fastening tab comprising a pile of extensions of the layers of reinforcing fibres of the pressure face part and/or suction face part of the main vane section with at least one complementary pile of a central layer of essentially unidirectional reinforcing fibres orientated substantially parallel to those of the said intermediate layer in the corresponding vane root or vane tip, and between two plies of balanced fabric of reinforcing fibres, the warp of which is orientated substantially parallel to the unidirectional fibres of the said central layer.

The composite vane may be solid, hollow, or alternatively such that the suction face part and pressure face part consitute laminated skins forming a rigid shell surrounding a core of cellular or foamed lightweight synthetic material, preferably having its external surface compacted and/or rendered proof against the resin used to agglomerate the laminated skins.

However, in any case, the three layers of reinforcing fibres of its laminated suction face part and pressure face part as well as the central layer of reinforcing fibres of the complementary pile of the vane root or vane tip may be single layers, that is to say layers consisting of just one ply of fabric, or of a single web or braid of reinforcing fibres, or alternatively layers each consisting of a pile of several plies of fabric, webs or braids of reinforcing fibres.

In order to procure mechanical performance similar to that of metal vanes which they are designed to replace, the composite vanes according to the invention are advantageously such that their laminated parts exhibit a reinforcing fibre content from approximately 40% to approximately 60% by volume.

For this purpose, according to a first embodiment, the internal layer of the pile has a structure selected from the following structures: a web of essentially unidirectional reinforcing fibres which are orientated substantially along the longitudinal axis of the vane, and at least one ply of fabric substantially 90% consisting of carbon fibres along the warp which is orientated substantially along the longitudinal axis of the vane, and substantially 10% consisting of glass or carbon fibres along the weft of the fabric.

However, according to another embodiment, the internal layer of the pile may, like the external layer of the pile of the laminated suction face part and pressure face part of the main vane section of the vane, have a structure selected from the following structures: a longitudinal braid of carbon fibres which are orientated from approximately 30° to approximately 70° with respect to one another and substantially symmetrically with respect to the longitudinal axis of the vane, and at least two superimposed webs of essentially unidirectional carbon fibres which are orientated substantially symmetrically from approximately ±15° to approximately ±35° with respect to the longitudinal axis of the vane.

Likewise, the intermediate layer advantageously has a structure selected from the following structures: a braid of essentially unidirectional reinforcing fibres which are orientated along the longitudinal axis of the vane, a superposition of at least two webs of essentially unidirectional reinforcing fibres which are orientated along the longitudinal axis of the vane, and a superposition of at least two plies of at least one fabric substantially 90% consisting of carbon fibres along the warp which is orientated substantially along the longitudinal axis of the vane, and substantially 10% consisting of glass or carbon fibres along the weft of the fabric.

As regards the complementary pile in the region of at least one from among the vane root and vane tip, its central layer may comprise a structure selected from the following structures: at least one web of unidirectional fibres, and at least one ply of fabric substantially 90% consisting of carbon fibres along the warp and 10% consisting of glass or carbon fibres along the weft.

However, in the region of the root of the vane, as an alternative, the complementary pile may comprise a pile of at least two plies of fabric of reinforcing fibres, the warp or weft of which is orientated substantially parallel to the longitudinal axis of the vane, and of at least two crossed plies of fabric of reinforcing fibres, the warp or the weft of which is orientated substantially at ±45° to the longitudinal axis of the vane.

In order to isolate, particularly, the carbon fibres of these layers of reinforcing fibres from the elements of the annular duct wall and of the central flow-straightener body to which the vane is fastened via its vane tip and vane root, and with the objective of preventing any oxidation due to a galvanic pair between the contacting materials, it is advantageous for the pile of the vane root and/or vane tip to comprise at least one layer of glass fibres in the zones coming into contact with, respectively, the central body and the annular wall of the duct.

When the vane tip or the vane root includes two transverse laminated fastening tabs extending in opposite directions from one another, it is advantageous to provide a laminated closing sole between these two fastening tabs, and comprising a pile of at least one ply of fabric of reinforcing fibres towards the inside of the vane, and of at least one ply of fabric of glass fibres towards the outside of the vane, the warp or the weft of the plies of fabric being orientated substantially along the transverse direction of the fastening tabs.

A vane thus produced may exhibit several vane root and/or vane tip configurations for linking it with the central body or with the wall of the duct. In particular, at least one fastening tab of the vane root and/or of the vane tip may be cambered with respect to the suction face part or pressure face part of the vane which it extends and extend above or respectively below the said suction face part or respectively pressure face part, being curved and/or inclined in a way that substantially corresponds to the curvature of a surface of the central body or of the annular duct-wall to which it is to be fastened, and/or so that the vane is inclined to the radial direction with respect to the axis of the duct and/or at a slant from its vane root towards its vane tip and from the upstream end to the downstream end in the duct, which is furthermore advantageous from the acoustic standpoint (reduction of the noise of interaction of the wake of the blades of the rotor with the vanes) and mechanical standpoint (the loading on the vanes is in compression and not in bending through the taking-up of the torque of reaction to the rotation of the rotor and better centering of the rotor in the duct).

In the region of the vane root, at least one fastening tab may exhibit a part bent substantially radially with respect to the axis of the duct for resting and fastening against a radial fastening flange of the central body. As an alternative, the vane root may exhibit Just one fastening tab extending substantially transversely on Just one side of the vane, and consisting of a pile comprising extensions of the laminated suction face and pressure face parts of the main vane section of the vane. According to another alternative, the fastening tab of the vane root extends substantially in the longitudinal extension of the main vane section and is intended to be fastened, preferably removably, simply resting against a take-up tab projecting outwards from the central body of the flow-straightener. In this case, the take-up tab may be one of the two tabs of a take-up clevis projecting outwards from the central body and in which clevis the fastening tab of the vane root is engaged and held.

In these various alternatives, it is advantageous for the fastening tab or tabs of the vane tip to be fastened removably by screwing onto an insert mounted in the annular wall of the duct, and the fastening tab or tabs of the vane root are fixed by riveting or better still by screwing, if an interchangeable composite blade is desired, onto the central body.

Another subject of the invention is a flow-straightener for a ducted counter-torque device as described hereinabove, and which is characterized in that its annular central body exhibits a lateral wall of cylindrical or cylindro-conical shape having an external surface which is substantially axially of revolution, to which the composite vanes with suction face and pressure face parts of their main vane section each comprising at least one layer of reinforcing fibres made rigid by a synthetic agglomerating resin, and preferably, although not exclusively, as defined hereinabove, are connected by their root, as well as a flange projecting radially inwards, preferably at one of its axial ends, for linking to the rotational-drive mechanism, and a turned-down rigidifying edge projecting radially inwards, preferably at the other axial end.

The central body may be made of metal, for example aluminium alloy, in which case each composite vane is individually removably attached to the central body, which may exhibit take-up tabs projecting outwards from its lateral wall and to each of which the root of a vane with a fastening tab substantially extending its main vane section is fastened.

However, as an alternative, each composite vane may equally well be attached removably to a central body made of a composite material compression-moulded in the hot state and comprising short reinforcing fibres, preferably made of glass, embedded in a thermosetting matrix, preferably of the vinyl ester type, and for each vane, the root of which extends the main vane section, exhibiting a clevis projecting outwards from its annular lateral wall and in which the vane root is held, as well as a rigidifying rib projecting towards the inside of the said wall, substantially in the region of the said clevis of the vane.

However, a better saving in mass can be obtained in a flow-straightener such that the central body and the vanes are of a single piece made of composite material, the root of each vane longitudinally extending the corresponding vane and being linked to the central body, comprising a pile of layers of reinforcing fibres substantially of the same nature as those of the vanes and agglomerated using the same resin, by linking layers of reinforcing fibres also substantially of the same nature as those of the vanes and also agglomerated using the same resin.

Another subject of the invention is a method for manufacturing a flow-straightener vane made of a composite, in which the suction face part and pressure face part of its main vane section each comprise at least one layer of reinforcing fibres made rigid by a synthetic agglomerating resin, and preferably, but not exclusively, as defined hereinabove, and the method according to the invention is characterized in that it comprises the steps consisting in moulding the vane in a closed mould under vacuum, by injecting the said synthetic resin, which is a substantially liquid thermosetting injection-moulding resin into a preform arranged in the mould and made up beforehand using layers of reinforcing fibres, essentially made of carbon, to substantially the shape of the vane.

If the vane is of the type comprising a core, the method advantageously comprises the steps consisting in:

preparing, for example by cutting-out, the set of plies of fabric and/or webs and/or braids of reinforcing fibres, essentially dry, with the dimensions required to form the vane, laying-up the prepared elements with a defined laying-up method in order to fort the vane, around a core of synthetic lightweight material formed beforehand, so as to produce a vane preform having a core surrounded by a sheath of reinforcing fibres, arranging the preform in the injection mould, of the type having at least two complementary parts with complementary internal cavities corresponding to the shape of the vane, closing the mould in a sealed manner and creating a vacuum therein, injecting under pressure into the mould a thermosetting resin at an injection temperature for which the resin is substantially liquid and of low viscosity, preferably not greater than 100 mPa.s, and ensuring that all the layers of reinforcing fibres are impregnated, carrying out a cycle of polymerizing the resin and then, after cooling the mould and its contents, opening the mould and releasing the vane.

In order to hold the fibres of the reinforcing layers of the preform in place before injection, it is furthermore advantageous to envisage a step of spreading a thermoreversible epoxy binder onto the plies of fabric and/or webs and/or braids of reinforcing fibres of the laid-up article.

The core may be made in various ways: it may be cut from a block of foam, or obtained by injecting a polyurethane foam in aerosol form into a mould, it being possible for the mould to be the mould for injection-moulding the vane, in the cavities of which mould models with the dimensions and shapes of the pressure face and suction face skins have been arranged beforehand. However, advantageously the core is formed by compressing a block of foam in a mould and superficially making it more dense. Furthermore, in order to promote good impregnation of the layers of fibres by the resin, the external surface of the core is rendered proof against the injection resin, before laying-up. This may be achieved by applying a heat-shrinkable skin around the core, welded to the core and then thermoformed. As an alternative, the surface of the core is rendered proof against the resin by superficially rendering the block of foam more dense under the action of heat while it is being pressed to form the core.

When the flow-straightener is of a single piece made of composite forming the annular central body and the vanes, the method of the invention comprises the steps consisting in:

compacting a core of lightweight cellular or foamed synthetic substance for each of the vanes of the flow-straightener, making a preform for each vane by laying-up layers of reinforcing fibres, previously prepared to the necessary dimensions, on the corresponding core, making a preform of the flow-straightener central body by laying-up and piling up the various layers of reinforcing fibres, previously prepared, which it includes, placing the preforms of the vanes and the preform of the flow-straightener body in an injection mould, laying-up, in the injection mould, layers of linking reinforcing fibres between the preforms of the vanes and of the flow-straightener body, closing the mould in a sealed fashion, creating a vacuum therein, preferably via the vane tips, and injecting a thermosetting resin at an injection temperature such that it has a low viscosity and is substantially liquid, then carrying out a polymerization cycle and finally releasing the flow-straightener from the mould.

BRIEF DESCRIPTION OF THE DRAWINGS

Other features and advantages of the invention will emerge from the description given hereinbelow without any limitation being implied, of embodiments described with reference to the appended drawings in which.

DESCRIPTION OF THE PREFERRED EMBODIMENTS

Figure 1:
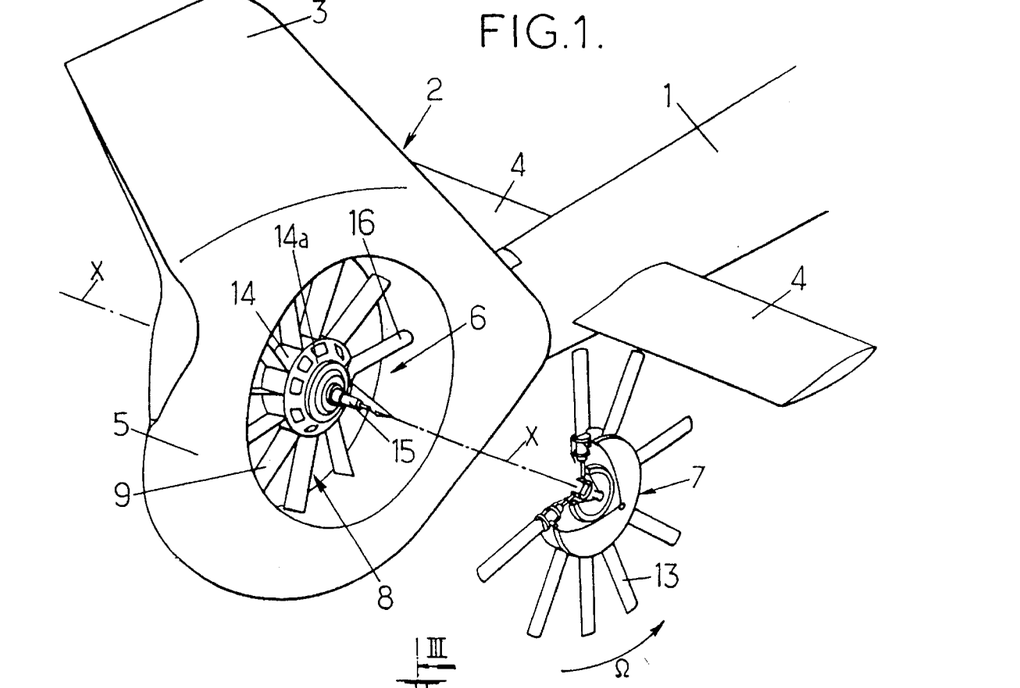
FIG. 1 is a ¾ perspective rear view of a ducted counter-torque device with rotor and flow-straightening stator arranged in a duct passing through the rear part of a helicopter, the rotor being represented out of the duct with partial cutaway for greater clarity.

In FIG. 1, the tail boom 1 of a helicopter, the fuselage and single main rotor of which have not been represented, supports, at its rear end, an empennage 2, the upper part of which is arranged as a vertical stabilizer 3, and a horizontal stabilizer with two control surfaces 4 extending on either side of the boom 1.

The base of the empennage 2 is arranged as a fairing 5 through which there passes transversely a duct 6 for the flow of air for a ducted counter-torque device also comprising a variable-pitch multi-blade rotor 7 mounted so that it can rotate and substantially coaxial in the duct 6, as well as a flow-straightening stator 8, fixed downstream of the rotor 7 in the duct 6 with respect to the direction of flow of the airflow passing through the latter, and including stationary vanes 9.

The duct 6 exhibits, about its axis X—X substantially transverse to the longitudinal axis of the helicopter, a substantially axisymmetric shape described with reference to FIG. 3 and comprising a convergent inlet 10, with rounded edge, extended towards the outlet of the duct 6 by a cylindrical part 11, itself extended up to the outlet by a divergent nozzle 12. The rotor 7 is mounted in the duct 6 on its inlet side and so that its blades 13 rotate in the cylindrical part 11 of the duct 6, the pitch change axes for the blades 13 defining a plane P of rotation of the rotor in which they move and which is substantially perpendicular to the axis X—X of the faired duct 6. The rotor 7 is mounted and rotationally driven on a rear transmission box 14a (see FIG. 1) housed and fastened within an annular central body 14 of cylindrical external shape and substantially coaxial with the duct 6, this body 14 being secured to the structure of the empennage 2 by means of the vanes 9 of the flow-straightener 8, which hold the body 14 at the center of the duct 6 and on its outlet side with respect to the rotor 7.

In this example, the body 14 is made by machining a block of aluminium alloy from a possibly forged blank. The body 14 envelops the rear transmission box, forming a mechanism for rotationally driving the rotor 7 by means of a drive shaft 15, itself driven from a transmission shaft passing through an arm 16 and linked to an auxiliary outlet of the main transmission box of the helicopter. Part of the arm 16 is arranged substantially radially in the duct 6, substantially in the place of one of the vanes 9 of the flow-straightener 8, in the space delimited between the two vanes 9 furthest from one another in FIG. 2. In a way which is also known, in order to vary the amplitude of the transverse counter-torque thrust generated by the rotation of the rotor 7 in the duct 6 creating a flow of air guided in this duct, the body 14 and the rotor 7 envelop a device for collectively controlling the pitch of the blades 13, this device being actuated by a control rod, not represented, because the arm 16 of FIG. 1 serves as a fairing for the transmission shaft and for this rod.

As far as the structure, the configuration and the operation of the rear transmission box and of the device for collectively controlling the pitch of the blades 13 which are housed in the body 17, as well as the rotor 7 are concerned, reference will advantageously be made to the French Patent FR 1,531,536, and to American Patents U.S. Pat. No. 3,514,097 and U.S. Pat. No. 4,626,173, which are incorporated into the present descriptive text by way of reference, because these members do not form the subject matter of the invention.

The vanes 9, fastened into the duct 6 downstream of the blades 13 of the rotor 7, without however leaving the divergent nozzle 12 of the duct 6, recover the rotational energy of the flow of air downstream of the blades 13, by straightening out this flow towards the axis X—X of the duct 6, and affording an additional counter-torque thrust as explained in U.S. Pat. No. 4,585,391, the description of which is incorporated into the present specification by way of reference, particularly as far as the description of FIGS. 4 and 5 of this patent are concerned.

The straightening-out of the airflow by the vanes is carried out in particular by appropriate selection of the asymmetric aerodynamic profile of the vanes 9, and in particular of its camber and angular setting relative to the axis X—X of the duct 6.

Figure 2:
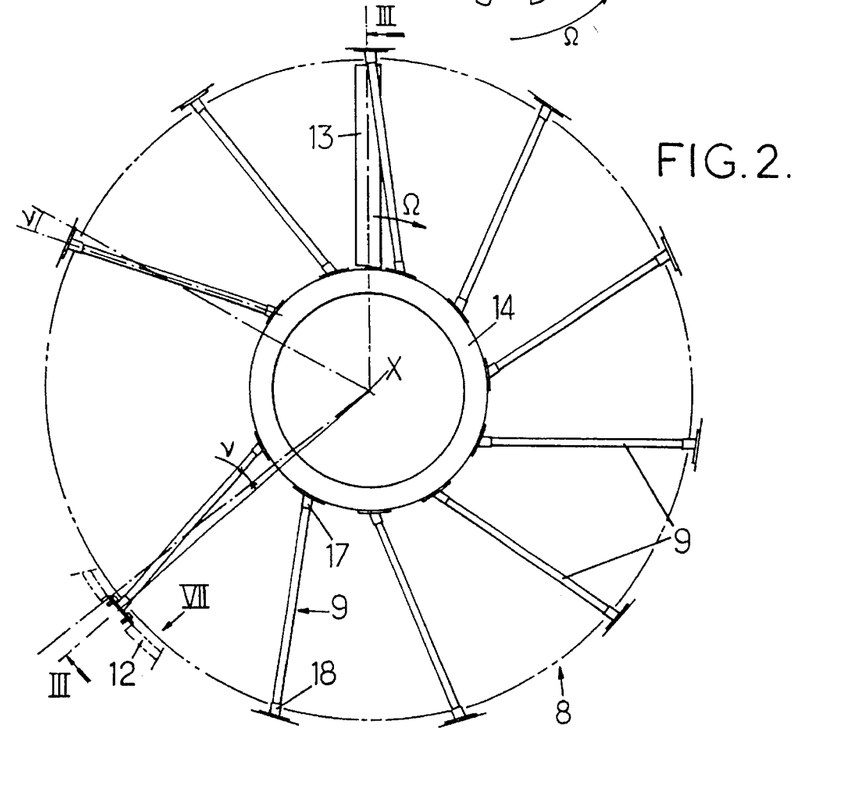
FIG. 2 is a partial diagrammatic view, in side elevation from the outlet side of the duct, of the flow-straightener of FIG. 1.
Figure 3:
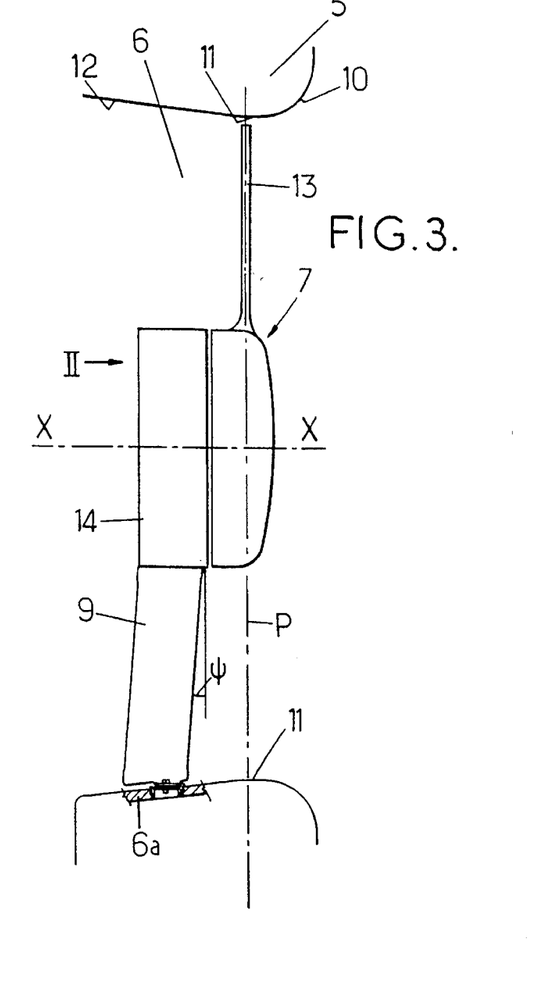
FIG. 3 is a section on III—III of FIG. 2, and with axial section of the link between a vane tip and the wall of the duct.

In the example of FIGS. 1 to 3, the flow-straightener 8 in a duct 6 1 m in diameter in the region of its cylindrical part 11, comprises ten vanes 9 with aerodynamic profile and the transmission arm 16, which are evenly distributed in a circumferential direction about the axis X—X. However, the arm 16 is substantially radial and of circular cross-section, while each vane 9 exhibits an aerodynamic profile of the NACA 65 type with, for example, a relative thickness of 10%, constant camber, selected between approximately 21° and approximately 27°, for example 23°, and a fixed angular setting selected between approximately 2° and approximately 3°, for example 2.5°, and orientated at a negative angle of attack. Furthermore, each vane 9 is not radial, but inclined to the radial direction by an angle v lying between approximately 1° and approximately 25°, measured across the span of the vane 9 at 0.8 R where R is the radius of the duct 6 as represented in FIG. 2, this inclination being from the root 17 of each vane 9, via which it is fastened to the body 14, towards the tip 18 of the vane 9, via which it is fastened to the lateral and annular wall 6a of the fairing duct 6, in the opposite direction to the direction of rotation of the blades 13 of the rotor 7, indicated by the arrow Ω. This angular setting of the vanes 9 with respect to the radial directions causes the torque of reaction to the rotation of the rotor 7, which acts upon the body 14, to be transmitted, in terms of compression in the vanes 9, rather than in bending, which increases the rigidity of the support of the body 14, of the members which it envelops and of the rotor 7 in the duct 6.

This inclination v, for example 10°, also decreases the rotational noise of the rotor 7, because it prevents the interference between the wake of a blade 13 and a vane 9 occurring simultaneously across the whole span common to the blade and to the vane, since the blades 13 are substantially radial with respect to the axis X—X of the duct 6.

The root 17 and the tip 18 of each vane 9, which attach individually and respectively to the cylindrical lateral wall of the body 14 and to the frustoconical surface of the divergent nozzle 12 of the duct wall 6a, are also contrived for each vane 9 to be additionally inclined at a slant from its root 17 towards its tip 18 and from the upstream end to the downstream end in the duct 6, by an angle Ψ as shown in FIG. 3, selected to be between approximately 1° and approximately 6°, for example 4°. This inclination Ψ makes it possible to keep the leading edge of the vanes 9 away from the plane of rotation P of the blades 13, and therefore from the trailing edge of the latter, particularly in the peripheral part of the duct 6, which is favourable to a decrease in the noise of interference between the blades 13 and the vanes 9. At the same time, in the central part of the duct 6, the vanes 9 can keep the body 14 close to the plane P of rotation of the rotor 7, which layouts good centering of the latter in the duct 6.

The main vane section 19 with aerodynamic profile extends along each vane 9 from its root 17 to its tip 18, and each vane 9 is made of composite materials with a matrix consisting of a synthetic agglomerating resin made rigid and reinforced with reinforcing fibres, essentially made of carbon, and the vane 9 is manufactured by implementing the known method known as "RTM" (Resin Transfer Moulding) essentially consisting in moulding the vane by injecting a liquid resin, preferably a thermosetting resin, into the layers of essentially dry reinforcing fibres preformed beforehand with substantially the shape of the vane and prearranged in a closed mould placed under vacuum.

Figure 5:
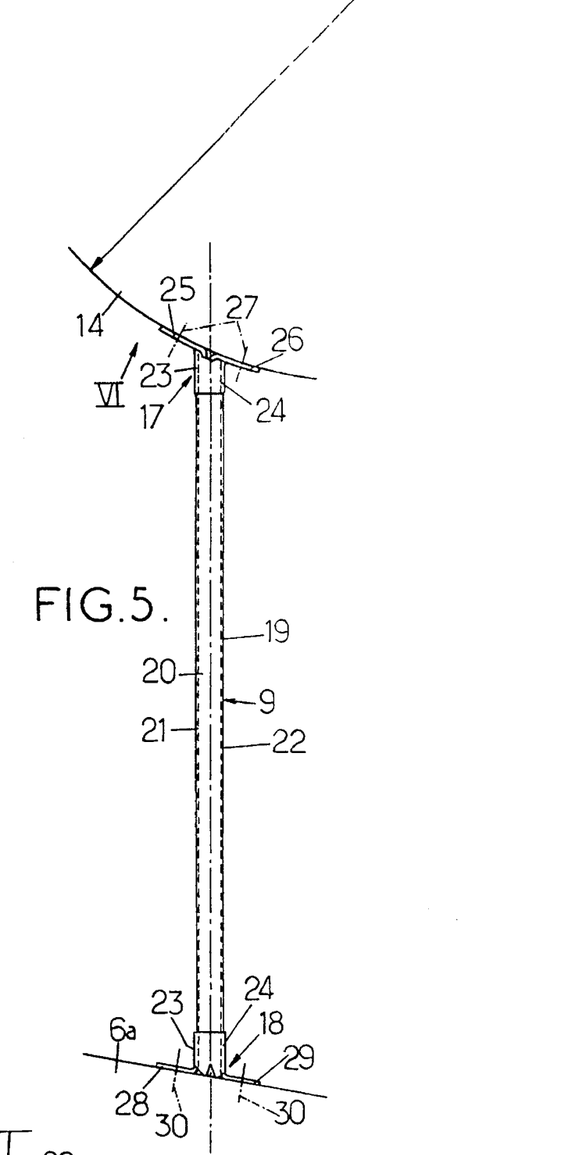
FIG. 5 is a view on a larger scale of a first example of a composite vane of the flow-straightener of FIG. 2, FIGS. 6 and 7 are views in the direction of the arrows VI and VII respectively in FIGS. 5 and 2, FIGS. 8, 9 and 10 are views respectively in plan, in front elevation and in perspective of a second example of a composite vane.
Figure 6:
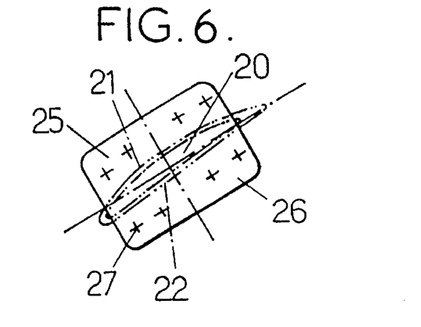
Figure 7:
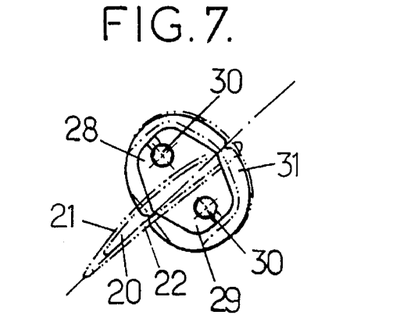

As represented in FIGS. 5 to 7, the main vane section 19 of the vane 9 comprises a foam core 20, for example one made of a foam with the commercial name Rohacell WF 51 (51 kg/m$^3$), the external surface of which is compacted and rendered proof against the injection resin, and the core 20 is surrounded by a rigid shell formed of the suction face part and pressure face part 21 and 22 each consisting, for example, of a pile of layers of reinforcing fibres agglomerated by the rigidifying resin, and thus constituting laminated skins.

In this example, each laminated skin 21 or 22 consists of a pile of three layers of reinforcing fibres made rigid by resin, and the internal layer (against the core 20) just like the external layer of the pile each consist of a 60° longitudinal braid of unidirectional carbon fibres, that is to say of a braid having two bundles of unidirectional fibres, the bundles being inclined by 60° with respect to each other and extending symmetrically with respect to the longitudinal axis of the vane 9, along its span. As an alternative, use may be made of a 45° longitudinal braid, or one such that the bundles of unidirectional fibres are inclined with respect to each other by an angle lying between approximately 30° and approximately 70°, symmetrically with respect to the longitudinal axis of the vane. According to another alternative, the external layer or the internal layer consists of the superposition of two unidirectional webs of carbon fibres which are orientated symmetrically with respect to the longitudinal axis of the vane 9 and inclined with respect to this axis by an angle of ±35° or of ±15°, or any angle falling between these values. The internal layer may equally well, in another alternative, consist of a web of unidirectional carbon fibres at 0°, that is to say orientated parallel to the longitudinal axis of the vane 9, or of a ply of a hybrid unidirectional fabric 90% consisting of carbon fibres forming the warp of the fabric orientated parallel to the longitudinal axis of the vane, and 10% consisting of glass fibres forming the weft of the fabric, or alternatively of a ply of a similar fabric in which the 10% of fibres along the weft are also made of carbon.

The intermediate layer of each laminated skin 21 or 22 essentially comprises unidirectional carbon fibres orientated along the longitudinal axis of the vane, and consists of a 0° longitudinal braid of such fibres, or, as an alternative, of a superposition of at least two but preferably three webs of unidirectional carbon fibres which superposition is parallel to the longitudinal axis of the vane, or alternatively in another alternative, a superposition of at least two but preferably three plies of a hybrid unidirectional fabric 90% consisting of carbon fibres along the warp, parallel to the longitudinal axis of the vane, and 10% consisting of glass fibres along the weft of the fabric, or of a similar fabric 10% consisting of carbon fibres along the weft.

The root 17 and tip 18 of the vane 9 are each also laminated and formed of thicker lateral parts 23 and 24 each consisting of a pile of extensions of the layers of fibres forming the web of the suction face 21 skin and, respectively, pressure face 22 skin of the main vane section 19 with, in addition, on the outside of these extensions, layers of fibres of an additional pile. In a first embodiment, the additional pile comprises, at the root 17, Just as at the tip 18 of the vane 9, a central layer of unidirectional carbon fibres parallel to the unidirectional fibres of the intermediate layer of the extensions of the suction face 21 skin and pressure face 22 skin, sandwiched between two plies of a balanced fabric (with substantially equal distributions of the fibres in the warp and in the weft of the fabric) of carbon fibres, the warp of which is orientated parallel to the unidirectional fibres of the central layer. The latter consists of at least one but preferably two superimposed webs of unidirectional carbon fibres at 0°, or as an alternative, of at least one but preferably two superimposed plies of hybrid unidirectional fabric with 90% of the carbon fibres along the warp, at 0°, and 10% of glass fibres along the weft, or similar fabric with 10% of carbon fibres along the weft. In a second embodiment, the additional pile at the vane tip 18 is made as above, but at the vane root 17 it consists, towards the inside (against the extensions of the laminated suction face skin 21 and pressure face skin 22) of at least two but preferably three plies of balanced fabric of carbon fibres, the warp or the weft of which is parallel to the longitudinal axis of the vane and, towards the outside, of two superimposed crossed plies of balanced fabric of carbon fibres, the warp or the weft of which is inclined at ±45° to the longitudinal axis of the vane.

The pile of the built-up parts 23 and 24 of the vane root and vane tip 17 and 18 is covered on the outside with at least one ply of glass fabric, in order to insulate the carbon fibres of the other layers in the zones of contact with the central body 14 and the annular wall 6a of the duct 6, and thus prevent any oxidation which would be due to a galvanic pair between the contacting materials.

In order to produce the webs for the laminated parts described hereinabove, it is possible to use, in particular, the fabrics marketed by the French company Brochier under the name Injectex, reference GU 230, for the 90/10 carbon/glass hybrid unidirectional fabric 0.26 mm thick, and reference GB 305 for the balanced carbon fabric which is a 2/2 twill weave 0.33 mm thick.

The layering webs of the various laminated parts are defined so that they exhibit a reinforcing fibre content of between approximately 40% and approximately 60%, by volume, and preferably close to 50%, the matrix preferably being an epoxy resin with a polymerization temperature of 180° C., for example the resin marketed under reference PR 500 by the American company 3M and with a density of 1.55. Alternatively, the matrix may be an epoxy resin of the so-called "120° C. class", for example the one marketed by the company Ciba Geigy under the name Araldite LY 564 with hardener HY 2954, which can be injected in the liquid state at 60° C. with a low viscosity of 100 mPa.s.

In the example of FIGS. 2 to 7, the laminated parts 23 and 24 of the vane root 17 are extended on the opposite side to the main vane section 19 by laminated parts cambered transversely to the longitudinal plane defined by the longitudinal axis and by the chord of the vane, and forming laminated fastening tabs 25 and 26 extending substantially in opposite directions from one another, one of them 25, on the same side as or "above" the suction face 21 skin, and the other, 26, on the same side as or "below" the pressure face 22 skin, as represented in FIGS. 5 and 6, and these tabs 25 and 26 are fastened to the lateral wall of the body 14 by fastening means represented diagrammatically at 27.

Likewise, the laminated parts 23 and 24 of the vane tip 18 are respectively extended, in a similar way, by laminated fastening tabs 28 and 29 extending in opposite directions from one another, one of them 28 on the same side as the suction face skin 21 and the other, 29, on the same side as the pressure face skin 22, these two tabs 28 and 29 being fixed to the wall of the divergent nozzle 12 of the duct 6 by removable fastening means 30.

Figure 4:
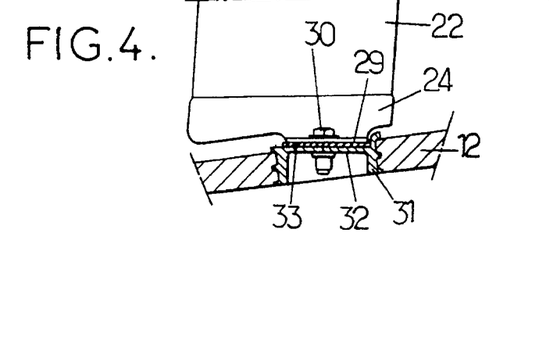
FIG. 4 represents, on a larger scale, the detailed axial section of the link between the vane tip and the duct.

As represented in FIGS. 4 and 7, the two tabs 28 and 29 of the vane tip 18 are each fastened by a screw-nut assembly 30 to the plane face 32, lying flush in the internal face of the divergent nozzle 12, of an insert 31 made of metal or composite, anchored into the wall of the divergent nozzle 12, with interposition of a removable shim 33 (for example a peel-off shim) between the tabs 28 and 29 and the insert 31, for adjusting the centering of the flow-straightener 8 within the duct 6.

The fastening tabs 25 to 29 of the vane 9 are curved and inclined with respect to its main vane section 19 so as to exhibit a curvature or an orientation which substantially corresponds to the curvature of the two surfaces, substantially axially of revolution, of the central body 14 and of the divergent nozzle 12 to which they are respectively fastened, and also so that the vane 9 exhibits the angles of inclination ν and Ψ as described hereinabove.

The means 27 for fastening the vane root 17 onto the central body 14 are rivets if an interchangeable flow-straightener 8 is desired, but may be screw-nut assemblies if interchangeable vanes 9 are desired, as these vanes are attached individually and removably to the body 14 as likewise to the wall 6a of the duct 6.

Figures 8, 9, 10:
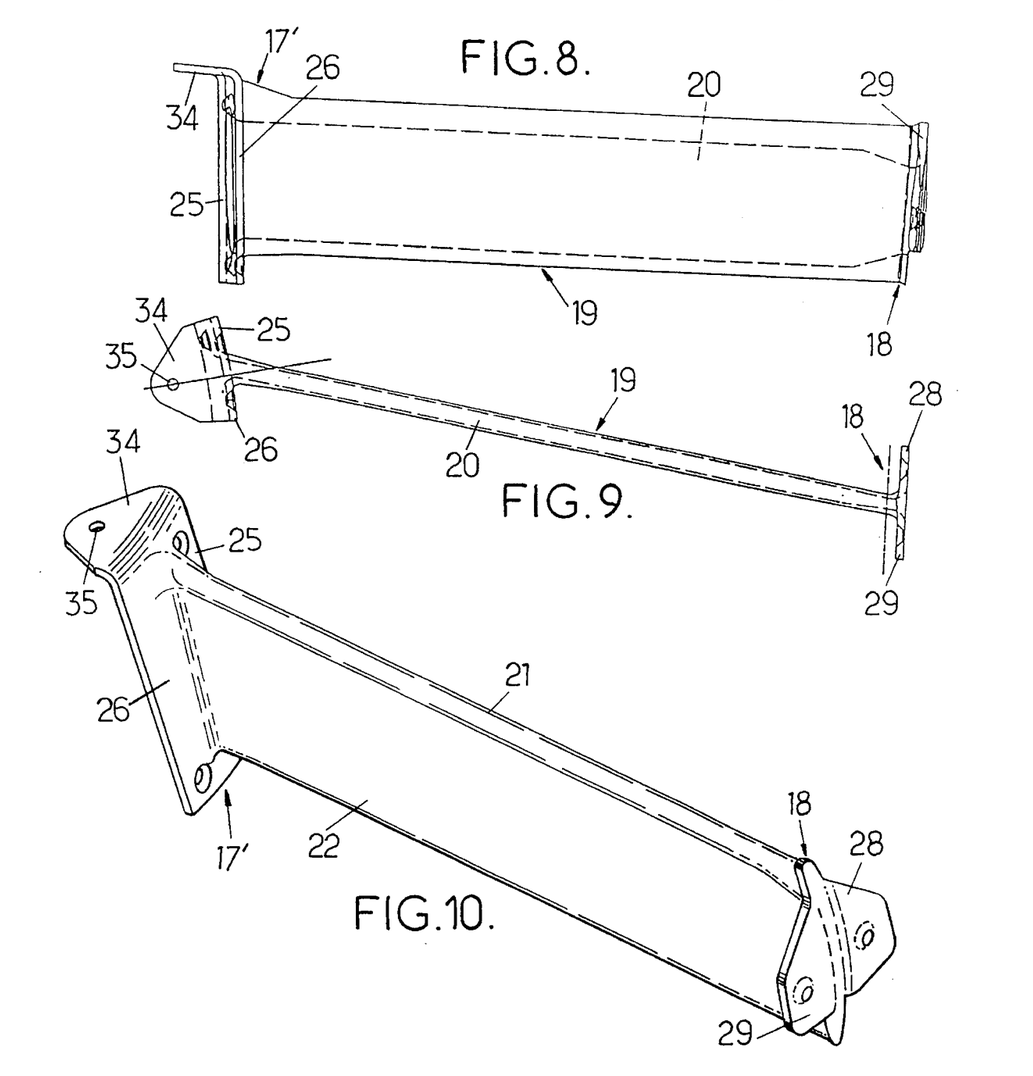

The example of a vane in FIGS. 8 to 10 is mainly differentiable from the vane of FIGS. 5 to 7 only in the production of the vane root, so that the same numerical references are used to denote the same elements. Thus, a vane tip 18 with two laminated fastening tabs 28 and 29 which are screw-fastened onto an insert in the wall of the duct, and a main vane section 19 with a foam core 20 surrounded by a laminated suction face skin 21 and pressure face skin 22 can again be seen.

However, the two laminated tabs 25 and 26 for fastening the vane root 17' are extended, on the same side as the leading edge of the vane, by a common part 34 which is cambered or bent substantially at right angles, in order to extend radially with respect to the axis X—X of the duct 6 when the vane is fitted into this duct and onto the central body 14, and this part 34 comes to rest against a radial flange projecting towards the inside at the front of the central body 14, in order to take up the rear transmission box 14a, and the part 34 exhibits an orifice 35 for screwing against this radial flange, the tabs 25 and 26 also being screw-fastened against the lateral wall of the central body 14.

This vane root 17' structure is advantageously suitable for an interchangeable vane.

Figure 11:
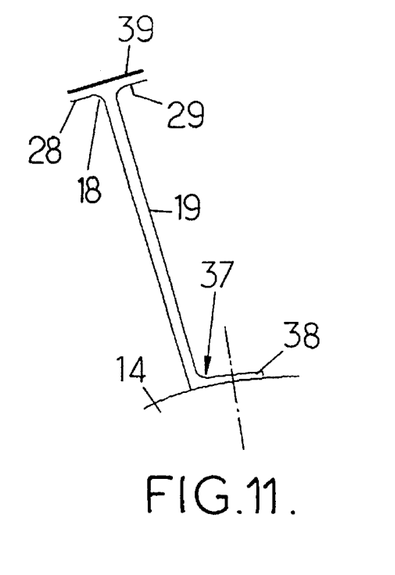
FIGS. 11 and 12 are diagrammatic views similar to FIG. 5 respectively of a third and a fourth example of a composite vane.

However, for a flow-straightener 8 with vanes riveted onto the central body 14, since it is tricky to rivet the root 17 of the vane 9 of FIGS. 5 to 7 owing to the inclination ν of the vane to the radial direction, and since it is also tricky to introduce loadings into the vane 9 because of the "unfolding" or "opening-out" of the blade root 17 to form the two fastening tabs 25 and 26, use is preferably made of a vane such as the one represented diagrammatically in FIG. 11.

In this example, the blade root 37 includes Just one transversal fastening tab 38 on Just one side of the main vane section 19 of the vane, and this tab 38 consists of the stack of the extensions of the layers of fibres of the laminated suction face and pressure face skins and of the layers of fibres of the additional piles as previously described, as well as of a layer of glass fibres in the zone for bearing and fastening against the central body 14.

Another difference with respect to the example of FIGS. 5 to 7 is that there is provided, between the two laminated and transverse fastening tabs 28 and 29, extending in opposite directions from one another at the blade tip 18, a laminated closure sole 39 consisting of the superposition of a ply of fabric of carbon fibres, towards the inside of the vane, and of two plies of fabric of glass fibres towards the outside, the warp or the weft of the plies of fabric being orientated in the transversal direction of the tabs 28 and 29.

Figure 12:
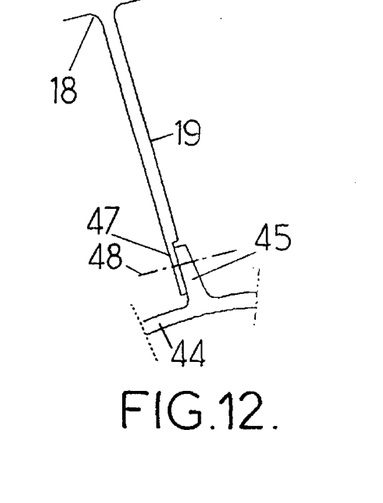

FIG. 12 diagrammatically represents another example of a vane which is good from the maintenance standpoint because it is interchangeable, and from the mechanical standpoint because it gives better introduction of loadings owing to the way in which the vane root 47 is taken up on the central body 44. In actual fact, the only main difference by comparison with the previous examples is that the vane root 47 is in the form of a single laminated fastening tab in the longitudinal extension of the main vane section 19 of the vane, and consisting of the superposition of extensions of the laminated suction face and pressure face skins of this main vane section, with a layer of protective glass fibres on one face of the tab 47 which is fastened removably by a screw-nut assembly sketched out at 48, simply resting on a take-up tab 45 machined to project outwards on the annular wall of the metal central body 44.

Figure 13:
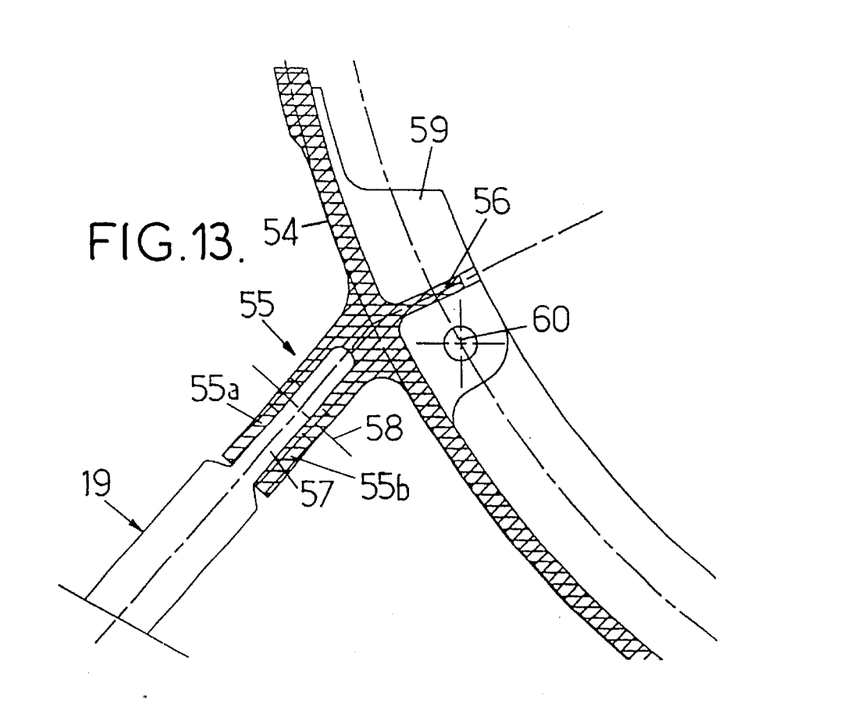
FIG. 13 is a diagrammatic view partly in elevation and partly in section of the root of a fifth example of a composite vane and of its link to a composite flow-straightener body.

FIG. 13 partially represents another example of a vane which, like that of FIG. 12, includes a vane root 57 designed as a laminated tab made in the same way as in the previous examples and in the longitudinal extension of the main vane section 19 of the vane. The laying-up and moulding of the vane are therefore simplified, owing to the fact that definition of the vane root 57 or 47 is simplified from the previous example. The vane of FIG. 13 is essentially differentiable from that of FIG. 12 by the fact that its tab for fastening the vane root 57 is inserted and held in a clevis 55 projecting towards the outside on the annular wall of the central body 54. This clevis 55 applies and transmits loadings down the vane more homogeneously. The clevis 55 is such that one of its tabs 55a is thinner than the other 55b. The thinner tab 55a is used for clamping the vane using a screw-nut assembly represented diagrammatically by the axis line 58, while the thicker tab 55b allows loads to be transmitted with greater rigidity.

Furthermore, in this example, the central body 54 is no longer made of metal but compression-moulded in the hot state using a composite material consisting of short glass fibres embedded in a thermosetting matrix of the vinyl ester type, the flow-straightener body 54 being made in a single piece after a polymerization cycle which lasts 3 min, for example at a temperature of 120° C., under a compacting pressure of the order of 10 MPa. In order to make this moulded body 54 rigid, the latter exhibits, substantially in the region of the base of the clevis 55, a rigidifying rib 56 projecting radially towards the inside of the annular wall of the body 54 and extending axially between a flange 59 projecting radially inwards, at the upstream end of the body 54 and pierced with holes 60 for taking up the auxiliary transmission box, by screwing, and a turned-down rigidifying edge, also projecting radially towards the inside of the annular wall of the body 54, but at its downstream end. Thus each rib 56 gives the flow-straightener body 54 suitable rigidity in the region of the connection of a corresponding clevis 55 to this body 54, that is to say the point where the loads are transmitted to the corresponding vane.

In the various examples described hereinabove, the vanes, each injection-moulded using the "RTM" method, are individually attached to a metal flow-straightener body (machined from aluminium alloy for example) or composite flow-straightener body (compression-moulded in resin reinforced with short fibres) it being possible for the link between each vane and the flow-straightener body to be achieved using screw-nut assemblies giving correct clamping and also the possibility of dismantling for any possible maintenance operation (vane change). When the flow-straightener assembly is fitted into the duct 6, the correct positioning of the flow-straightener 8 is assured by adjusting the shims 33 in the region of the inserts 31 (see FIG. 4).

However, any composite vane, the main vane section of which has its suction face part and pressure face part each comprising at least one layer of reinforcing fibres made rigid by a synthetic agglomerating resin may be moulded by the method of the invention.

Figure 14:
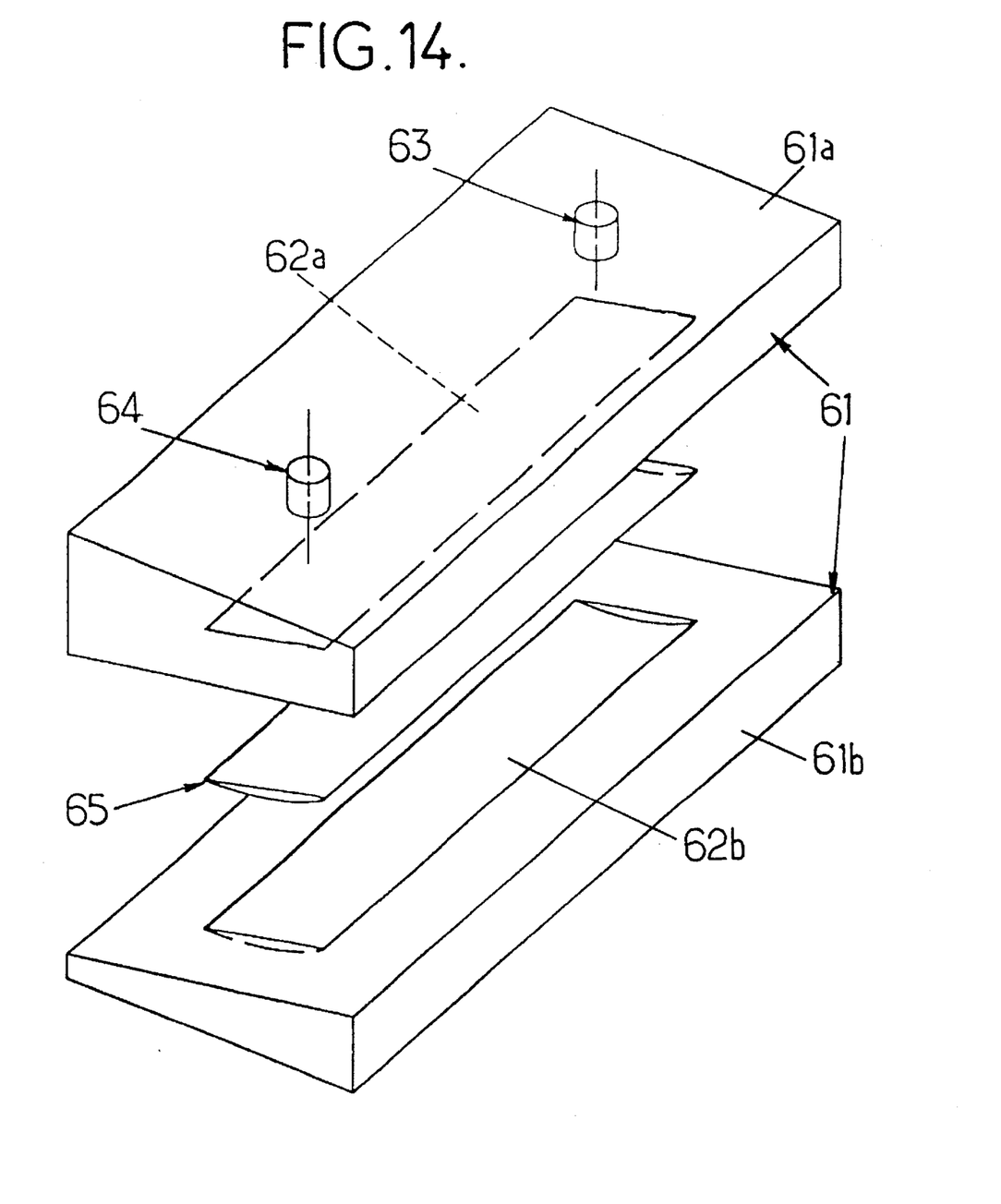
FIG. 14 is a diagrammatic perspective view of an injection mould and of a composite vane preform.

The injection-moulding of the vanes using the RTM method is described hereinbelow with reference to FIG. 14, diagrammatically representing an injection mould of well-known structure. This mould 61 essentially comprises two half-moulds, an upper one 61a and a lower one 61b, each exhibiting one of the two internal cavities 62a and 62b which complement one another in order to form a cavity corresponding to the aerodynamic profile of the main vane section of the vane, as well as to the profile of its root and of its tip, when the two half-moulds 61a and 61b are closed on one another by clamping and closure means which are not described because they are well known, centering being assured by centering pins, also well known (not represented), and the mould includes a vacuum take-off 63, opening into the mould cavity and connected by a union to a vacuum pump (not represented) as well as a resin injection lead-in 64 also opening into the mould cavity. In a well-known fashion, the cavity 62a of the upper half-mould 61a may correspond to the shape of the suction face of the vane in its root, its tip and its main vane section and, likewise, the cavity 62b of the lower half-mould 61b may correspond to the shape of the pressure face of the vane in its three parts, so that the parting line of the two half-moulds 61a and 61b passes through the leading and trailing edges of the vane.

The use of an injection resin of the so-called "180° C. class" leads to the use of a metal mould 61, for example one machined from aluminium alloy. In contrast, if the injection resin used is of the so-called "120° C. class", the mould 61 may be made of a composite material, using a casting resin filled with metal particles. This mould made of composite material may be obtained by overmoulding a model of a vane, for example one made of metal.

The manufacture of a vane begins by producing a preform 65 made by laying-up the prepared, for example pre-cut, layers of reinforcing fibres of predetermined nature, orientation and dimensions, as described hereinabove, around the foam core 20.

This core 20 is first of all prepared by compressing a block of foam in a mould giving it shape and superficial compacting. This mould for the core may be a specific mould, also of conventional structure, made in two parts with complementary internal cavities, the two parts being clamped together and around the block of foam, until they come to bear against one another via the parting line. Alternatively, the foam core 20 may equally well be formed by compressing a block of foam in the injection mould, in which the cavities 62a and 62b will previously have been filled with models, for example made of lead, having the shape and sizes of the pressure face and suction face skins which are to surround the core. The core 20 may be rendered superficially more dense by compressing the block of foam in the cold state, in which case it is appropriate then to render the surface of the core proof against the resin used, to prevent the latter from migrating into the foam core. This is brought about by surrounding the core with a film of a heat-shrinkable material welded and shaped around the core by blowing hot air.

However, the proofing of the core against resin may be obtained at the same time as the core is made superficially dense by compacting this core with the action of heat, which has the effect of closing the cells of the foam of the core at its surface.

With the foam core having been prepared, it is covered with reinforcing fibres, essentially dry ones, for example by laying-up around the core the braids of fibres, webs of fibres and plies of fabric of fibres previously cut to the required dimensions, when laying-up is carried out using layers of fibres of predetermined nature and orientation, in accordance with the examples described hereinabove. A preform 65 of the vane is thus produced by placing around the foam core 20 the layer or layers of reinforcing fibres constituting the suction face and pressure face skins, as well as the laminated parts of the vane root and vane tip, with their fastening tabs. The various layers of fibres involved in the laying-up are held in place by light bonding using an aerosol lacquer, or by the use of at least one layer of reinforcing fibres lightly coated with a thermoreversible epoxy binder holding the fibres of one and the same reinforcing layer together. The vane preform 65 consisting of the core surrounded by the covering of reinforcing fibres formed of the layer or layers of fibres that the finished vane comprises is then placed in the open injection mould 61, of which the surfaces of the cavities 62a and 62b of the two mould parts 61a and 61b have previously been prepared to ensure good mould release. This preparation may consist in covering each of the cavities 62a and 62b with a film of adhesive PTFE, such as that marketed under the trade name NYTO-FLON, the parting line for the two half-moulds 61a and 61b being covered, for example, with a mould-release agent of the type marketed under the name FREEKOTE 700. The mould 61 is then closed in a sealed manner around the preform 65, and a vacuum is created therein via the take-off 63. The mould 61 is then baked to heat it until the very heart of the mould 61 reaches a temperature corresponding to the temperature for which the injection resin used will be liquid and of lowest viscosity. The mould is then taken out of the oven and injection takes place through the lead-in 64, under pressure, after the resin for the matrix has been prepared (blending and degassing). Before it is injected into the mould 61 through the lead-in 64, the resin may be heated up in an appropriate heat exchanger and its heating-up to reach a sufficiently low viscosity for injection may be finished off in a groove made in the mould 61 and serving to receive the resin before it migrates through the layers of fibres of the preform 65. The mould 61 may be stood vertically during injection of the resin, the injection lead-in 64 being located towards the bottom and the vacuum take-off 63 towards the top, so that the resin correctly impregnates the layers of fibres of the preform 65 from the bottom upwards, driving the residual air particles out of the preform 65 in order to obtain absence of porosity in the injected vane. After injection, the mould 61 containing the preform 65 impregnated with injection resin is laid down flat in an oven or under a press with a heating plate for the polymerization phase. This phase is followed by a phase of cooling of the mould and of its contents, then of opening the mould and releasing the vane therefrom.

During the phase of polymerizing the resin, there is a slight expansion of the superficially compacted foam core 20, this ensuring that there is a sufficient internal compacting pressure of the lay-up of the layer or layers of reinforcing fibres. For an injection resin of the so-called 120° C. type, the temperature of the mould at the beginning of injection lies between approximately 62° C. and approximately 59° C., and at the end of injection between approximately 50° C. and 55° C., in order to keep the resin at a temperature of the order of 60° C. for which it is liquid and exhibits low viscosity, not greater than 100 mPa.s. For a vacuum of the order of $10^5$ Pa in the mould, the injection pressure for the resin, at the beginning of the injection phase, is of the order of $0.75 \times 10^5$ Pa to $10^5$ pa, and at the end of injection, of the order of $2.5 \times 10^5$ Pa to $3 \times 10^5$ Pa. The polymerization cycle may last 1 h 30 at 80° C., and the cooling may be slow in ambient atmosphere.

Furthermore, to give correct protection against lightning and rolling-off of static electric charges, each vane incorporates electrically conducting metal elements so as to give electrical continuity between the central body 14 and the rear transmission box which it encloses as far as the inserts in the annular wall of the duct 6. These electrically conducting metal elements may be a copper foil or a bronze or copper netting incorporated into the series of webs and extending as far as into the root and into the tip of the vane and the fastening tabs of these parts, as far as the through-holes for the screw-nut assemblies for fastening the vane.

Figure 15:
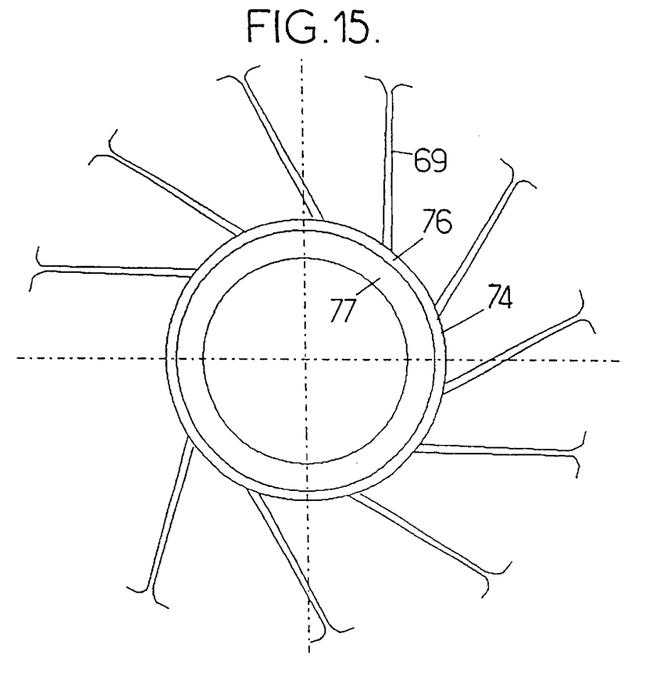
FIG. 15 is a diagrammatic rear elevation (that is to say from the outlet side of the duct) of an alternative flow-straightener made of composite with vanes of a single piece with the central body.

FIG. 15 represents another example in which the ten vanes 69 and the annular central body 74 of the flow-straightener are of a single piece made of composite materials and moulded in a single injection of resin using the RTM method. The main vane section and the tip of each vane 69 are identical to the corresponding parts of the vanes of the preceding examples, but the root of each vane 69 is in the longitudinal extension of the corresponding vane and is linked to the central body 74 by linking layers of reinforcing fibres which are of the same nature as the layers of reinforcing fibres of the pressure face and suction face parts of the vanes 69, and agglomerated using the same resin, used for the single injection step. The central body 74 has a laminated structure consisting of a pile of layers of reinforcing fibres also of the same nature or of a similar nature to that of the pressure face and suction face parts of the vanes 69, and agglomerated using the same injection resin.

Figure 16:
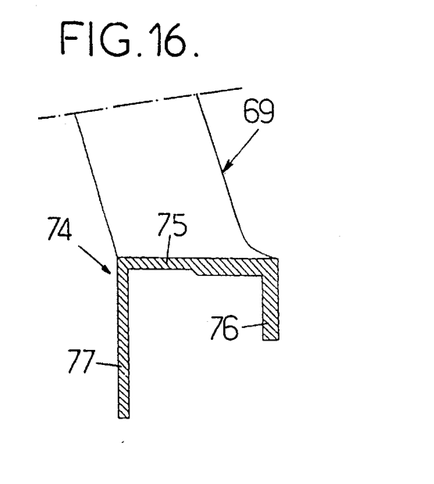
FIG. 16 is an axial half-section of the central body and a side elevation view of a continuous part of a vane of the flow-straightener of FIG. 15, FIGS. 17 and 18 are two plan views of plies of fibres for linking the vanes to the central body of the flow-straightener of FIGS. 15 and 16, and FIGS. 19 and 20 are partial diagrammatic views from the front representing the respective arrangement of the plies of FIGS. 17 and 18 for linking the vanes to the central body of the flow-straightener.

FIG. 16 shows that each vane 69 attaches over the entire chord of its root to the lateral wall 75 of the central body 74, this wall 75 being thicker in its upstream part extended, at its upstream axial end, by an internal radial flange 76 for taking up the rear transmission box, while the downstream part of the lateral wall 75 is thinner and is extended, at its downstream axial end, by an internal radial turned-down edge 77 of the same thickness, therefore thinner than the upstream flange 76.

In a first example, the thinnest section of the annular wall 75 and of the turned-down edge 77 corresponds to a pile of ten plies of fabric of carbon fibres with the warp orientated in the circumferential direction of the central body 74, the four innermost plies, like the four outermost plies of the pile being made of balanced fabric, and in the thickest part of the body 74, corresponding to the flange 76 for taking up the rear transmission box and to the upstream part of the lateral wall 75, this pile is supplemented by four plies of fabric of carbon fibres having the same orientation, the two external plies of this additional pile being made of balanced fabric. In the region of the root of each vane (69), the lay-up of the flow-straightener body 74 additionally comprises two superimposed 60° braids of unidirectional carbon fibres arranged under the four outer plies of balanced fabric.

According to a second example of a flow-straightener body 74, the thinnest section in its main vane section and in the downstream turned-down edge 77 is given by a pile, from the inside to the outside, of one ply of balanced 0° carbon fabric (with the warp orientated in the circumferential direction of the body 74) then of two superimposed webs of unidirectional carbon fibres orientated in the same direction, then by four superimposed plies of fabric of carbon fibres, the two central plies of which are made of balanced fabric, with the same orientation for these four plies, then another two superimposed layers of unidirectional carbon fibres with the same orientation, and finally an outer ply of balanced 0° carbon fabric. In the region of the flange 76 and of the thickest upstream part of the lateral wall 75, this pile is supplemented, towards the outside, and as in the previous example, by four superimposed plies of fabric of carbon fibres orientated at 0°, namely two plies of balanced fabric and, also as in the previous example, in the region of each vane root, two superimposed 60° braids of unidirectional carbon fibres are incorporated before the last four layers of the basic pile.

The manufacture of this single-piece flow-straightener assembly includes the production of a preform 65 as described hereinabove for each of the vanes 69, by covering a foam core with the layer or layers of reinforcing fibres for each vane, as well as the production of a preform for the body with a set of layers of reinforcing fibres, for example according to one of the two aforementioned examples. The manufacturing method therefore includes the formation and compacting of the foam cores for the vanes 69, the laying-up of the vanes on these compacted cores to form the vane preforms 65, the laying-up of the layers of reinforcing fibres to form the preform of the flow-straightening body 74 around tooling which will be incorporated into the injection mould, then placing the various preforms of the vanes 69 and of the central body 74 into the injection mould, and laying-up linking plies between the preforms of the vanes and that of the body, then closing the injection mould in a sealed fashion, causing a vacuum therein and injecting a liquid resin under pressure, injection being substantially central while the vacuum is created in the cavities of the mould from the vane tips, this injection step ensuring good migration of the resin for impregnating all the layers of reinforcing fibres of the various preforms, and being followed by a polymerization cycle, itself followed by a step of cooling and finally of mould release.

Figure 17:
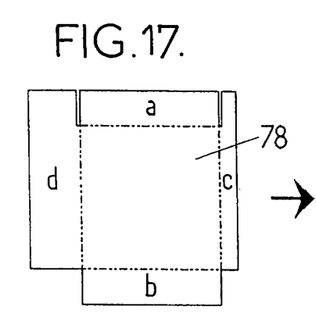
Figure 18:
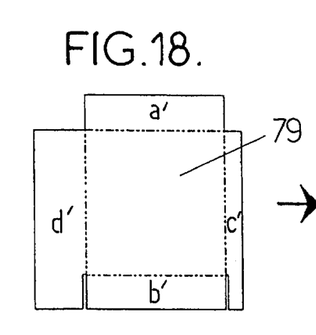
Figure 19:
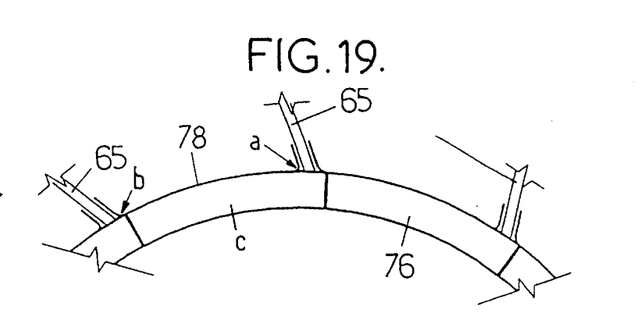
Figure 20:
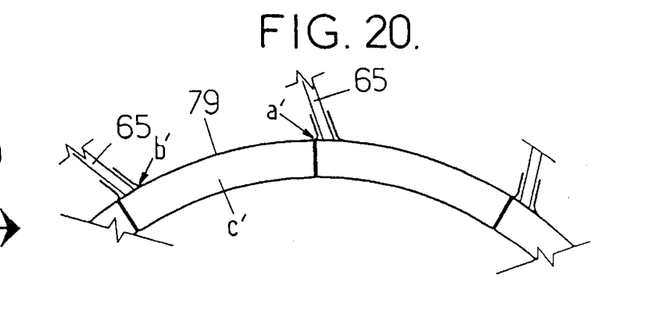

As regards the laying-up of the linking plies between the vanes 69 and the body 74, FIGS. 17 and 18 represent, in plan view, two plies which can be put in place in succession alternately to ensure continuity of the geometry of the single-piece flow-straightener and good transmission of the loads between the vanes 69 and the body 74. In parallel, FIGS. 19 and 20 diagrammatically represent the method for putting the plies respectively of FIGS. 17 and 18 in place. The ply 78 of fabric of carbon fibres of FIG. 17 has its central part which bears against the outer lateral face of the annular part 75 of the preform of the body 74, between two consecutive vane preforms 65, and this ply 78 includes an upper flap a and a lower flap b which are rectangular and transversal and bear respectively, in the case of the first one for example, against the pressure face of the root of a preform 65 and, in the case of the second, against the suction face of the root of an adjacent preform 65, and this ply 78 also includes two lateral flaps c and d which are rectangular and longitudinal, the first, c, having a width equal to the radial dimension of the flange 76, and the second, d, having a width equal to the radial dimension of the turned-down edge 77, and these flaps c and d are folded respectively over the flange 76 and over the turned-down edge 77 extending, at their ends situated on the sides of the flap a, substantially as far as the suction surface of the root of the preform 65 against the pressure face of which flap a is applied.

The next ply 79 also includes its central part applied against the outer surface of the annular part 75 of the preform of the body 74, between the same two preforms 65, and it has two flaps a' and b' which are rectangular and transversal, of the same dimensions as the flaps a and b of the ply 78, as well as two lateral flaps c' and d' of the same dimensions as the flaps c and d of the ply 78, but such that the free ends of the flaps c' and d' extend on either side of the flap b', and not on either side of the flap a as is the case for the ends of the flaps c and d of the ply 78. FIG. 20 shows that the flaps a' and b' are applied respectively, like the flaps a and b, and on top of the latter, and that the flaps c' and d' are folded down onto the flange 76 and the turned-down edge 77, partially overlapping, with an offset in the circumferential direction, the flaps c and d of the previous ply 78, the flaps c' and d' this time extending as far as the region of the pressure face of the preform 65 against the suction face of which the flaps b and b' are applied.

With such a laying-up, the same rigidities are obtained for the central body 74, just as for the vanes 69, as for a flow-straightener with metal vanes attached to a metal central body, but benefiting from an appreciable weight saving, greater than 20%.

We claim:

1. A counter-torque device for a rotary-wing aircraft comprising:

a duct passing through a rear part of the aircraft and having a duct axis substantially transverse to a longitudinal axis of the aircraft, said duct including an annular duct wall;

a rotor mounted substantially coaxial with the duct axis in said duct;

a rotational drive mechanism fastened substantially coaxially to the duct axis in said duct which drives said rotor to create an airflow in said duct; and a flow-straightening stator which is fastened in said duct downstream of said rotor with respect to a direction of the airflow, said stator including (a) an annular central body to which said drive mechanism and the associated said rotor are mounted, and (b) composite vanes, each said vane having a main vane section provided with an aerodynamic profile for straightening out the airflow downstream of said rotor to be towards the duct axis, a vane root at a radially inner end of said main vane section which is attached to said central body and a vane tip at a radially outer end of said main vane section which is attached to said annular duct wall, whereby said vanes support said central body in said duct and hence mount said drive mechanism and said rotor in said duct, a laminated suction face and a laminated pressure face on each said main vane section, each said laminated face comprising a pile of at least three layers of reinforcing carbon fibers made rigid by a thermosetting synthetic agglomerating resin, at least an internal one or an external one of said three layers of said pile comprising two sets of unidirectional fibers being orientated from approximately 30° to approximately 70° with respect to each other and being substantially symmetrically with respect to a longitudinal vane axis of said vane, an intermediate one of said three layers of said pile comprising a set of unidirectional fibers orientated substantially along the longitudinal vane axis, and at least one of said vane tip or said vane root having a laminated fastening tab, said fastening tab comprising (1) a pile of extensions of the reinforcing fibers of the three layers of said pile of an associated one of said laminated faces and (2) at least one complementary pile including (i) a central layer of unidirectional reinforcing fibers orientated substantially parallel to the reinforcing fibers of said intermediate layer, and (ii) two plies of balanced fabric of reinforcing fibers between which said central layer is sandwiched, said plies of fabric having a warp which is orientated substantially parallel to the unidirectional fibers of said central layer.

2. A counter-torque device as claimed in claim 1 wherein said laminated suction face, said laminated pressure face and said laminated fastening tab of each said vane all exhibit a reinforcing fiber content of approximately 40% to approximately 60% by volume.

3. A counter-torque device as claimed in claim 1 wherein said internal layer of said pile is one of:

(a) a web of unidirectional reinforcing fibers orientated substantially along the longitudinal vane axis, or (b) at least one ply of fabric of substantially 90% carbon fibers along a warp thereof orientated substantially along the longitudinal vane axis and one of substantially 10% glass fibers or substantially 10% carbon fibers along a weft thereof.

4. A counter-torque device as claimed in claim 1 wherein at least one of said internal and external layers of said laminated faces is one of:

(a) a longitudinal braid of two sets of carbon fibers which are orientated from approximately 30% to approximately 70% with respect to one another and substantially symmetrically with respect to the longitudinal vane axis, or (b) at least two superimposed webs of unidirectional carbon fibers which are orientated symmetrically from approximately ±15° to approximately ±35° with respect to the longitudinal vane axis.

5. A counter-torque device as claimed in claim 1 wherein said intermediate layer of said laminated faces is one of:

(a) a braid of unidirectional reinforcing fibers orientated substantially along the longitudinal vane axis, (b) a superposition of at least two webs of unidirectional reinforcing fibers orientated along the longitudinal vane axis, or (c) a superposition of at least two plies of at least one fabric of substantially 90% carbon fibers along a warp thereof orientated substantially along the longitudinal vane axis and one of substantially 10% glass fibers or substantially 10% carbon fibers along a weft thereof.

6. A counter-torque device as claimed in claim 1 wherein said central layer of said complementary pile is one of:

(a) at least one web of unidirectional reinforcing fibers, or (b) at least one ply of fabric of substantially 90% carbon fibers along a warp thereof and one of substantially 10% glass fibers or substantially 10% carbon fibers along a weft thereof.

7. A counter-torque device as claimed in claim 1 wherein said vane root includes said fastening tab and said complementary pile includes (a) a pile of at least two plies of fabric of reinforcing fibers, the warp or weft of which is orientated substantially parallel to the longitudinal vane axis, and (b) at least two crossed plies of fabric of reinforcing fibers, the warp or the weft of which is orientated substantially at ±45° to the longitudinal vane axis.

8. A counter-torque device as claimed in claim 1 wherein said pile of extensions includes at least one layer of glass fibers in a zone which comes into contact with an associated one of said central body or said annular duct wall.

9. A counter-torque device as claimed in claim 1 wherein there are two of said laminated fastening tabs extending in opposite directions from one another and a laminated closing sole provided between said two fastening tabs, said closing sole including (a) at least one ply of fabric of reinforcing fibers towards an inside of said vane, and (b) at least one ply of fabric of glass fibers towards an outside of said vane, said plies of said closing sole having a warp or weft orientated substantially along a transverse direction of said fastening tabs.

10. A counter-torque device as claimed in claim 1 wherein said fastening tab is: (a) cambered with respect to an associated one of said suction or pressure faces such that said fastening tab extends above the associated said suction face or below the associated said pressure face; and (b) at least one of (i) curved or inclined to correspond substantially to a curvature of the associated said central body or of the associated said annular duct wall to which said fastening tab is fastened, (ii) inclined to a radial direction with respect to the duct axis, or (iii) slanted from said vane tip to said vane root and from an upstream end to a downstream end of said duct.

11. A counter-torque device as claimed in claim 10 wherein said central body includes a radial fastening flange for each said vane root; and wherein each said fastening tab is used to fasten an associated said vane root to said central body and includes a part bent substantially radially with respect to the duct axis for resting and fastening against said radial fastening flange of said central body.

12. A counter-torque device as claimed in claim 1 wherein each said vane root includes a fastening tab extending substantially transversely from one of said laminated faces of an associated said vane, said fastening tab being formed of a pile comprising extensions of the piles of the one of said laminated faces of the associated said vane.

13. A counter-torque device as claimed in claim 1 wherein each said vane root includes a fastening tab extending substantially parallel to the longitudinal vane axis; and wherein said central body includes a take-up tab for each said vane root projecting outwards from said central body and to which an associated said fastening tab is removably attached.

14. A counter-torque device as claimed in claim 1 wherein each said vane root includes a fastening tab extending substantially parallel to the longitudinal vane axis of an associated said vane; and wherein said central body includes a clevis for each said vane root having opposed take-up tabs projecting outwards from said central body to which an associated said fastening tab is attached.

15. A counter-torque device as claimed in claim 14 wherein for each said vane:

said annular duct wall includes an associated insert;

said fastening tab at said vane tip is fastened removably by a screw to the associated said insert;

said fastening tab at said vane root is fastened removably to said central body by one of a screw or a rivet.

16. A counter-torque device as claimed in claim 1 wherein each said vane is a solid.

17. A counter-torque device as claimed in claim 1 wherein each said vane includes a hollow center.

18. A counter-torque device as claimed in claim 1 wherein each said main vane section includes (a) a core of lightweight synthetic material with one of a compacted external surface or resin resistant surface, and (b) a rigid shell surrounding said core which forms said suction face and said pressure face.

19. A counter-torque device for a rotary-wing aircraft comprising:
   a duct passing through a rear part of the aircraft and having a duct axis substantially transverse to a longitudinal axis of the aircraft, said duct including an annular duct wall;
   a rotor mounted substantially coaxial with the duct axis in said duct;
   a rotational drive mechanism fastened substantially coaxially to the duct axis in said duct which drives said rotor to create an airflow in said duct; and
   a flow-straightening stator which is fastened in said duct downstream of said rotor with respect to a direction of the airflow, said stator including
      (a) an annular central body having
         a lateral body wall with one of a cylindrical or cylindro-conical shape and with first and second axial ends,
         a flange projecting radially inward from said lateral wall at the first axial end of said lateral body wall to which said drive mechanism and the associated said rotor are mounted, and
         a turned-down rigidifying edge projecting radially inward from the second radial end, and
      (b) composite vanes, each said vane having
         a main vane section provided with an aerodynamic profile for straightening out the airflow downstream of said rotor to be towards the duct axis,
         a vane root at a radially inner end of said main vane section which is attached to said lateral body wall and a vane tip at a radially outer end of said main vane section which is attached to said annular duct wall, whereby said vanes support said central body in said duct and hence mount said drive mechanism and said rotor in said duct,
         a laminated suction face and a laminated pressure face on each said main vane section, each said laminated face comprising a layer of reinforcing fibers made rigid by a synthetic agglomerating resin.

20. A counter-torque device as claimed in claim 19 wherein each said vane is removably attached to said central body.

21. A counter-torque device as claimed in claim 20 wherein said central body is made of a metal material and includes a plurality of take-up tabs projecting outwardly from said lateral wall; and wherein each said vane root includes a fastening tab extending substantially parallel to the longitudinal vane axis which is attached to a respective said take-up tab of said lateral wall.

22. A counter-torque device as claimed in claim 21 wherein said central body is made of a composite material compression-molded in a hot state, said material including a thermosetting matrix and short reinforcing fibers embedded in said matrix, and wherein said central body includes (a) a respective clevis projecting outwards from said lateral body wall in which each respective said vane root is held, and (b) a respective rigidifying rib projecting towards an inside of said lateral body wall adjacent each respective said clevis.

23. A counter-torque device as claimed in claim 22 wherein said thermosetting matrix is a vinyl ester type and said reinforcing fibers are glass.

24. A counter-torque device as claimed in claim 22 wherein said central body and said vanes are made from a single piece of composite material including a pile of layers of reinforcing fibers made rigid by a synthetic agglomerating resin, each said vane root longitudinally extending from an associated said vane and being linked to said central body by linking layers of the reinforcing fibers and resin thereof.

* * * * *